United States Patent [19]

Fournier et al.

[11] Patent Number: 4,904,095
[45] Date of Patent: Feb. 27, 1990

[54] MOUNTING ARRANGEMENT FOR BEARINGS

[75] Inventors: Jean-Pierre Fournier, Ecos; Gilles Turin, Vernon, both of France

[73] Assignee: Societe Europeenne De Propulsion, Suresnes, France

[21] Appl. No.: 287,077

[22] Filed: Dec. 20, 1988

[30] Foreign Application Priority Data

Dec. 23, 1987 [FR] France ................. 87 18080

[51] Int. Cl.$^4$ ............................................. F16C 23/06
[52] U.S. Cl. ..................................... 384/517; 384/535
[58] Field of Search ............... 384/493, 504, 517, 535, 384/563, 581, 585

[56] References Cited

U.S. PATENT DOCUMENTS

| | | | |
|---|---|---|---|
| 2,556,368 | 6/1951 | Hegeman | 384/517 |
| 2,885,583 | 5/1959 | Zunick et al. | 384/535 X |
| 3,035,878 | 5/1962 | Bell et al. | 354/196 |
| 3,307,890 | 3/1967 | Johansson | 384/517 |
| 3,838,899 | 10/1974 | Sampatacos | 384/517 |
| 4,226,485 | 10/1980 | Pruvot | 384/563 X |
| 4,551,032 | 11/1985 | Mottershead | 384/517 |
| 4,611,934 | 9/1986 | Piotrowski et al. | 384/517 |

FOREIGN PATENT DOCUMENTS

| | | |
|---|---|---|
| 581879 | 10/1946 | Fed. Rep. of Germany ...... 384/517 |
| 859547 | 7/1949 | Fed. Rep. of Germany . |
| 2476407 | 8/1981 | France . |

Primary Examiner—Thomas R. Hannon
Attorney, Agent, or Firm—Weingarten, Schurgin, Gagnebin & Hayes

[57] ABSTRACT

An arrangement for mounting two bearings supporting a shaft within a housing, each bearing having an inner race secured to the shaft and an outer race, the arrangement comprising two annular membrane-shaped spacer members having a high radial stiffness and a predetermined axial flexibility, the spacer members having an outer edge and an inner edge, the inner edge of each spacer member being secured to the outer race of a respective bearing and the outer edge of each spacer member being secured within the housing, both spacer members being subjected to a predetermined amount of axial deformation with respect to their unstressed condition, whereby the spacer members exert a precisely determined axial preload onto said outer races of the bearings.

5 Claims, 4 Drawing Sheets

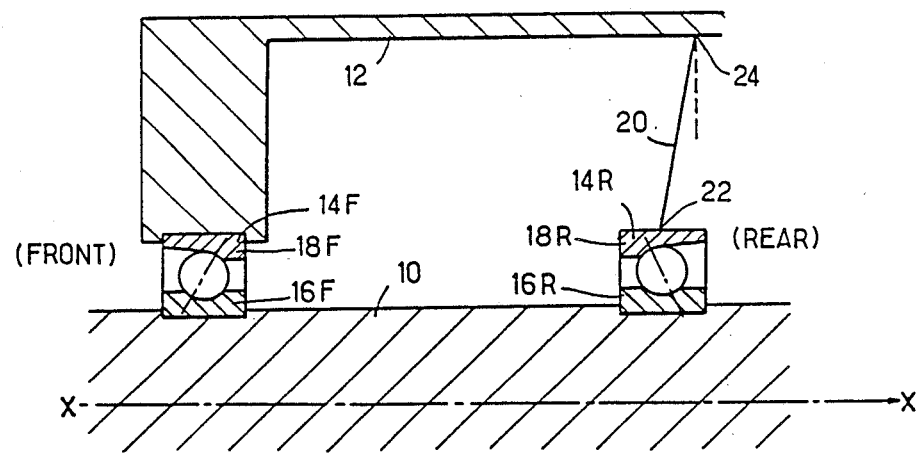
PRIOR ART Fig-3
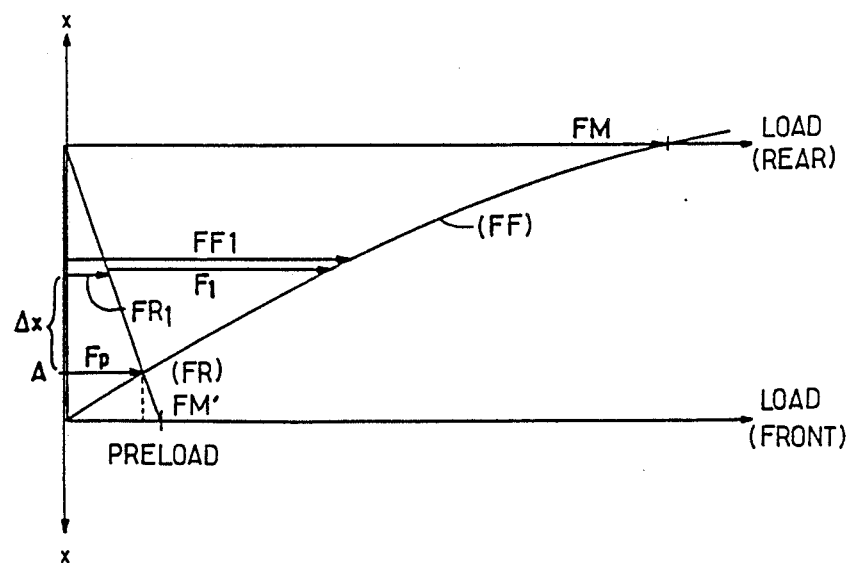
Fig-4

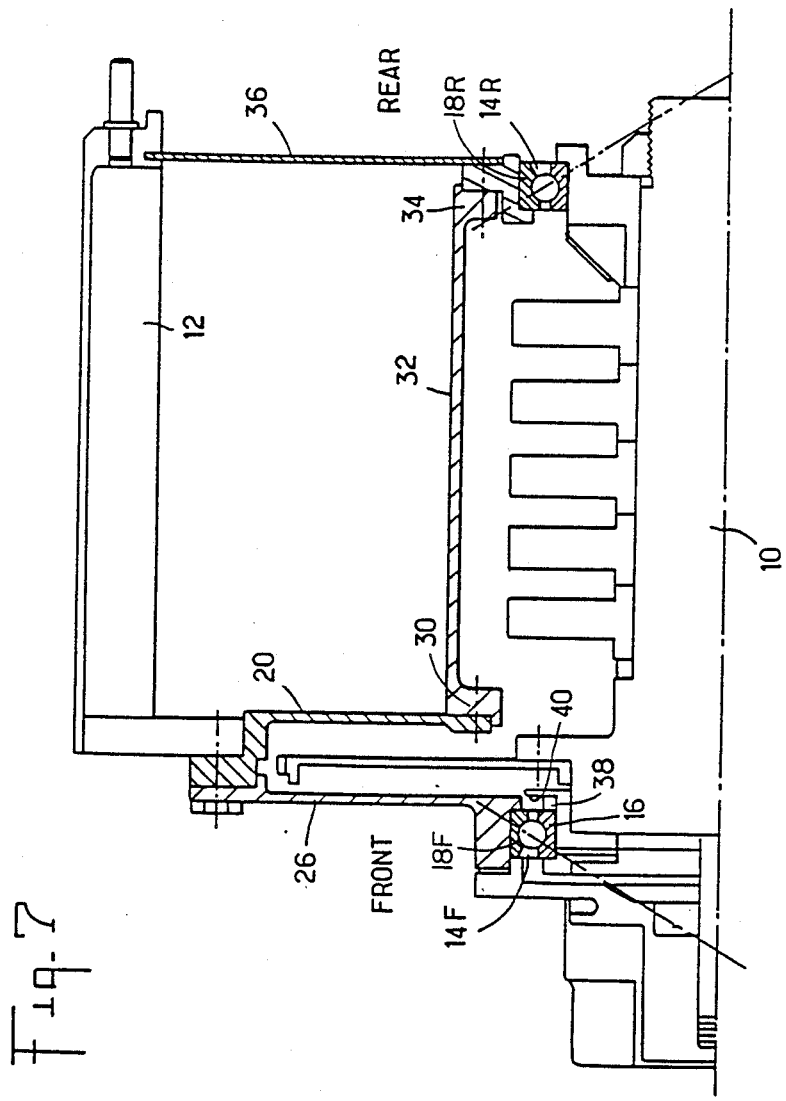

MOUNTING ARRANGEMENT FOR BEARINGS

FIELD OF THE INVENTION

The present invention relates to an arrangement for mounting two bearings supporting a rotary shaft within a housing.

In the ensuing specification and claims, the term bearing is used to denote either roller bearings or roller or ball bearingns, and the term roller is to be understood as generic of both rollers and balls.

In the mounting of a rotary shaft which may be subjected to axial thrusts, it is necessary to impart an axial preload to the bearings which support the shaft in order to avoid that the rollers and races of one of the bearings become separated when the axial load borne by this bearing becomes null or negative.

This is customarily achieved by dimensioning the parts which ensure the mounting of the bearings as a function of the own stiffness of each part involved in the mounting.

However, it is practically observed that, when the mounting comprises two identical bearings, the maximum axial thrust which can be exerted onto the shaft before one of the bearings becomes separated, is at best 2.8 times the axial preload. Moreover, such a mounting is extremely sensitive to external conditions, notably the temperature, as well as internal conditions, notably the wear of the races, which impairs the performance of such a mounting.

It is known from French application No. 2476407 or U.S. Pat. No. 4,226,485 to assemble one of the bearings via a spacer membrane extending between the outer race of the bearing and the housing, which spacer member has a high radial stiffness and a predetermined axial flexibility which allows to impart a predetermined axial preload to the bearing.

Such a mounting is less sensitive to dimensional variation caused by heat than a rigid mounting, but the maximal axial thrusts which may be applied before the bearing becomes separated widely differ according to the direction of the thrust. Further, the resulting axial flexibility of the mounting differs according to the direction of the applied axial thrust. Accordingly, this mounting is restricted to apparatuses in which the direction of the axial thrust remains constant in use.

German Patent No. 859547 discloses the mounting of the two outer races of the bearings by means of two annular flexible membranes. However, the mounting of the outer races of the bearings onto the inner edge of the membranes lacks precision in terms of both axial and radial flexibility or stiffness of the membranes. As a consequence, the arrangement disclosed in this reference is ineffective to establish a precisely controlled location of the axis of the shaft with respect to the housing nor is it effective to establish a precisely controlled axial preload onto the bearings.

SUMMARY OF THE INVENTION

The present invention relates to an arrangement for mounting two bearings supporting a shaft within a housing, each said bearing having an inner race secured to the shaft and an outer race, the arrangement comprising two annular membrane-shaped spacer members having a high radial stiffness and a predetermined axial flexibility, said spacer members having an outer edge and an inner edge, the inner edge of each spacer member being secured to the outer race of a respective bearing and the outer edge of each spacer member being secured within the housing, both said spacer members being subjected to a predetermined amount of axial deformation with respect to this unstressed condition, whereby the spacer members exert a precisely determined axial preload onto said outer races of said bearings.

According to a further feature of the invention, both annular membrane-shaped spacer members are placed in vicinity of each other, whereby both spacer membranes are subjected to almost identical environmental conditions, one of the members being secured at its inner edge directly onto the outer race of one of the bearings, whereas the other membrane, secured at its outer edge within the housing in propinquity to the first membrane is secured at its inner edge onto an end portion of an elongated sleeve surrounding the shaft, the opposite end portion of the sleeve mounting the outer race of the other bearing.

In addition, a centering membrane is mounted between this opposite end portion of the sleeve and the housing, said centering membrane having a high radial stiffness but a negligible axial stiffness since its sole purpose is to maintain the centering of the bearing, avoiding its own axial stiffness to interfere with the axial flexibility of the two spacer membranes.

BRIEF DESCRIPTION OF THE DRAWINGS

Other details and advantages of the invention will be readily apparent on reading the ensuing description, with reference to the appended drawings, wherein :

FIG. 3 is a schematic cross-section of a second prior art mounting arrangement.

FIG. 4 is a graph similar to that of FIG. 2 and relating to the arrangement of FIG. 3.

FIG. 7 is a cross-section of an embodiment of the invention.

DESCRIPTION OF PRIOR ART

Figure 1:
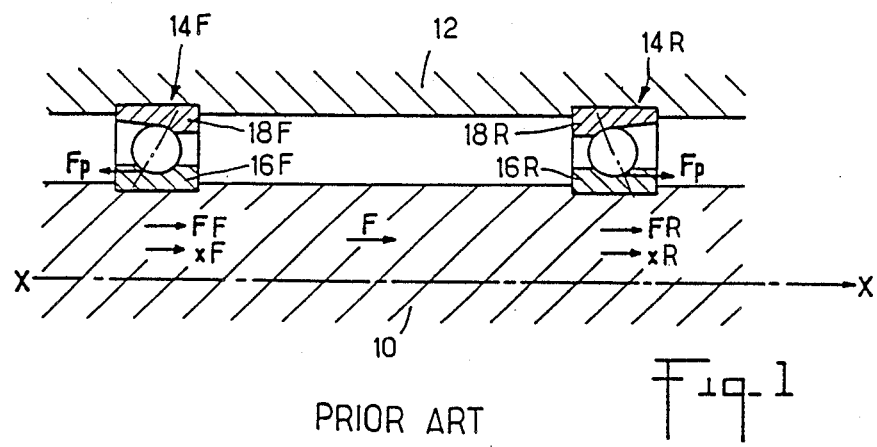
FIG. 1 is schematic cross-section of a prior art mounting arrangement for two bearings supporting a rotary shaft.

As known from the prior art and illustrated in FIG. 1 a substantially rigid mounting of a shaft 10, revolving about an axis XX and mounted within a housing 12 is ensured by two bearings 14F and 14R. Each bearing has an inner race 16F, 16R directly secured onto the shaft 10 and an outer race 18F, 18R directly secured within the housing 12.

The axial dimensions of the components and their characteristics are selected in order to impart to the bearings an axial preload $F_P$ which, in the absence of any axial thrust onto the shaft 10 is equally applied onto the two bearings 14F and 14R.

When an axial thrust F is applied to the shaft 10, for example in the direction of the arrow at the figure, this thrust will raise the axial load $F_P$ borne by the front bearing 14F and correspondingly lower the axial load $F_R$ borne by the rear bearing 14R, and the shaft being axially displaced by a distance $\Delta x$ from its initial balanced position.

Beyond a maximal thrust $F_M$, the axial load borne by the rear bearing 14R decreases to zero and the races and the rollers of this bearing become separated, which detrimentally affects the operation.

Figure 2:
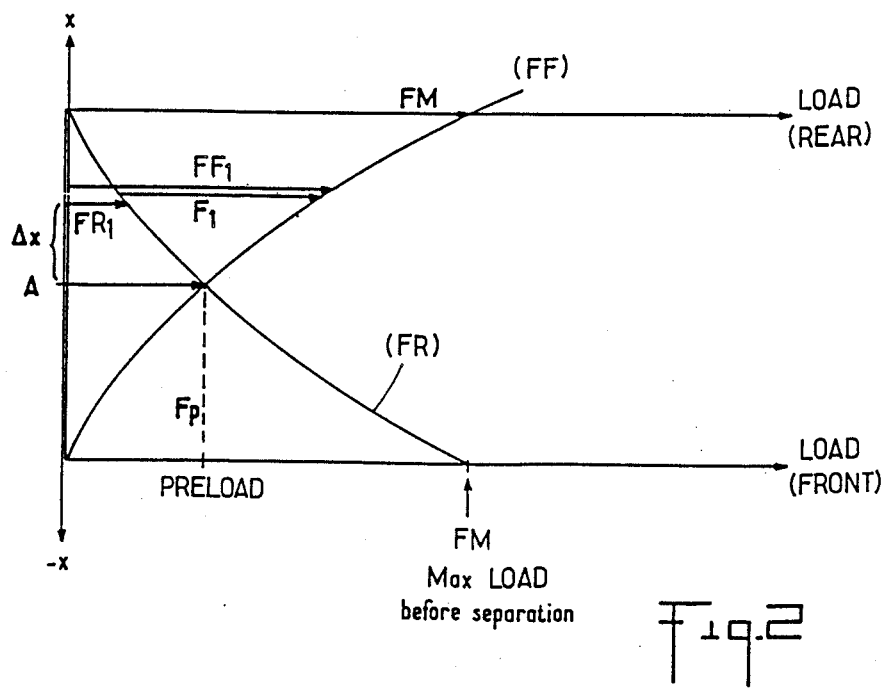
FIG. 2 is a graph illustrating the relationship between the axial loads borne by the bearings and the axial displacements of the shaft in the arrangement of FIG. 1.

The graphs of FIG. 2 contain the experimental curves illustrating the relationship between the axial loads ($F_F$) and ($F_R$) borne by the front and rear bearings 14F and 14R respectively as a function of the axial thrust applied to the shaft 10, or correlatively of the axial displacement $\Delta x$ of the shaft from its initial position A.

Loads are shown in abscissae and dislacements in ordinate; positive displacements towards the right of the figure, being oriented upwards and negative displacements towards the left, being oriented downwards.

It is noted that the shaft initially occupies a balanced position denoted by the origin point A and the axial loads onto the bearings are both equal to $F_P$, commensurate with the length of the horizontal segment between point A and the intersection of curves ($F_F$) and ($F_R$).

When an axial thrust F1 is applied, the shaft is displaced by an axial distance $\Delta x$ and the axial loads borne by the bearings become $F_{F1}$ and $F_{R1}$, such that $F_{F1} - F_1 = F_{R1}$.

Beyond a certain limit, $F_R$ becomes null and the races and the rollers of the bearing 14R become separated. In this condition, the maximal axial thrust $F_M$ is equal to $F_F$ and practical experiments have shown that $F_M = 2.8 F_P$.

However, this kind of mounting is highly sensitive to various factors, among which the precision of the axial dimensions of the several components of the assembly, and the ambient temperature. In fact, the components are made of various materials having different thermal expansion ratio and small temperature variations may result in important variations of the axial preload $F_P$. Hence, the maximal axial load $F_M$ cannot be precisely and accurately determined.

Moreover, undesired variations of the axial position $\Delta x$ of the shaft may occur, such as variation caused by the wear of the bearing races or by the ingress of impurities into the bearings.

According to a second prior art arrangement known from FR patent No. 2476407 and schematically illustrated in FIG. 3, the rear bearing 14R is not directly secured to the housing 12 but rather by means of a spacer membrane 20.

Membrane 20 is a flat disc-shaped member having an inner edge 22 secured to the outer race 18R of the rear bearing 14R and an outer edge 24 secured within the housing 12. In addition, the spacer membrane has a high radial stiffness and a predetermined axial flexibility.

As a consequence of its high radial stiffness, the spacer membrane 20 maintains a practically perfect centering of the bearing 14R and hence of the shaft 10 within the housing 12.

As a consequence of its predetermined axial flexibility, any axial displacement of the inner edge of the membrane away from the plane defined by the membrane in its unstressed condition generates a preload $F_P$ applied to the outer races $18_F$, $18_R$ of the bearings $14_R$, $14_R$.

From point A, representing the balanced position of the shaft in the absence of axial thrust, the application of an axial thrust $F_1$ causes the shaft to move axially by a distance $\Delta x$ and a modification of the axial loads $F_{F1}$ and $F_{R1}$ borne by the bearings $14_F$ and $14_R$.

As shown in the graph of FIG. 4, the maximal axial thrust $F_M$ beyond which the races and the rollers of the rear bearing $14_R$ become separated, or in other terms the axial load $F_R$ becomes null, is much higher than in the previous arrangement, for a same axial preload $F_P$.

Obviously the above description refers to axial thrusts applied in the direction from the front bearing towards the rear bearing, i.e. towards the right of FIG. 3.

Referring to axial thrusts applied in the opposite direction, the maximal thrust $F_M$ beyond which the races and rollers of the front bearing $14_F$ become separated, i.e. : when $F_F$ becomes null, is much lower.

DESCRIPTION OF THE INVENTION

Figure 5:
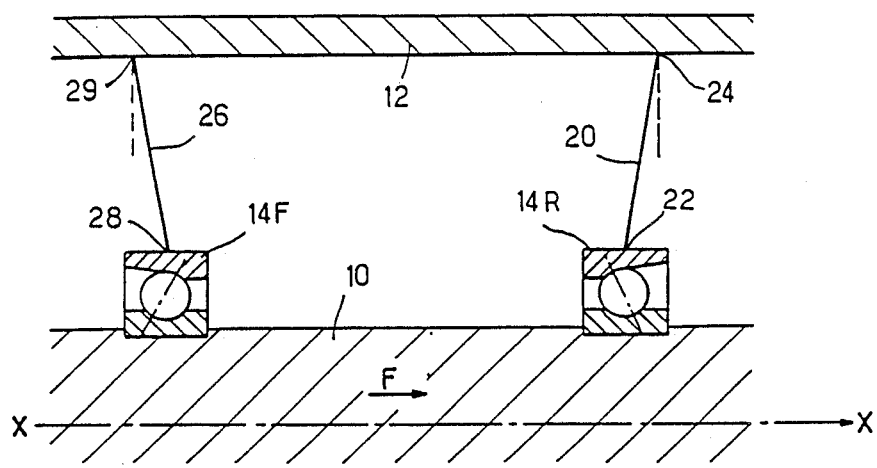
FIG. 5 is a schematic cross-section of an arrangement according to the invention.

According to the present invention, and an schematically illustrated in FIG. 5, both bearings $14_F$, $14_R$ are mounted by means of spacer membranes 20 and 26 which have both the afore described features.

Figure 6:
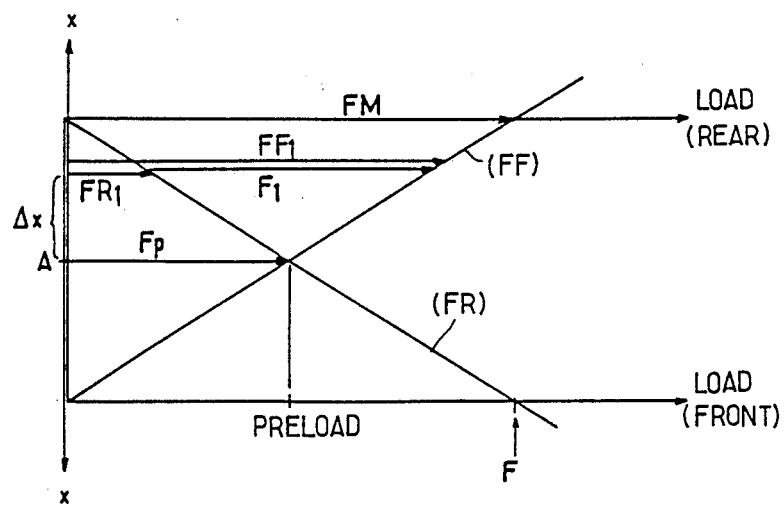
FIG. 6 is a graph similar to those of FIG. 2 and 4 and relating to the arrangement of FIG. 5.

Hence, when the inner edges 22, 28 of the spacer membranes are deformed towards each other from their unstressed position, the shaft 10 assumes a balanced position, denoted by A at FIG. 6 substantially symmetrical with respect to both ($F_F$) and ($F_R$) curves, such that both bearings are subjected to the same axial preload $F_P$.

As in the previous cases, application of an axial thrust $F_1$ causes the shaft to move axially by a distance $\Delta x$ and a variation of the axial loads $F_{F1}$ and $F_{R1}$ borne by the front and rear bearings $14_F$, $14_R$, and the maximum axial thrust $F_M$ beyond which the races and rollers of one of the bearings $14_R$ becomes separated being equal to $F_F$.

In this embodiment, it is observed that the reaction to an axial thrust applied in the opposite direction is symmetrical.

In other words, the maximal axial thrust which can be applied is the same irrespective of the direction, and the resulting axial flexibility of the mounting arrangement is identical in both directions, until the maximal axial thrust is reached.

In the best mode of carrying out the invention exemplified in the embodiment shown in FIG. 7, both spacer membranes 20, 26 are located close to each other at the same end of the housing 12. The front membrane 26 mounts directly the outer race 18F of the front bearing 14F whereas the rear membrane 20 mounts an end portion 30 of an elongated tubular sleeve 32 surrounding the shaft 10 and extending axially until the outer race 18R of the rear bearing 14R, the opposite end portion 34 of the sleeve 32 being secured thereto.

Advantaeously, the outer edges 24, 29 of the membrane 20,26 contact each other and are provided with interfitting shapes which ensure their precise axial and radial positioning relative to each other.

Owing to this arrangement, both spacer membranes 20, 26 are located in substantially identical environmental conditions and will be similarly affected thereby, more particularly as temperature is concerned.

Obviously, the rear bearing 14R must be centered with respect to the housing 12 and this is ensured by a third membrane 36, or centering membrane, having a high radial stiffness but conversely a negligible axial stiffness, thus allowing the centering membrane 36 to follow substantially freely the axial displacements of the shaft 10, without exerting undesired axial forces onto the rear bearing 14R and/or the shaft 10.

This embodiment is more particularly intended for the mounting of rotary shafts in apparatuses which are subjected to extremely different temperatures at either end. The spacer membranes will then preferably be located at that end where the lowest temperature prevails.

In this embodiment, the means for imposing a precisely controlled initial deformation to the spacer memberane 26, 20 consists of a ring 38 trapped between the inner race 16F of the front bearing and a shoulder 40 of the shaft. The axial thickness of the ring 38 is such that the spacer membrane is deflected, with respect to this unstressed condition, by a precisely predetermined amount, whereby the axial preload exerted by the spacer membranes 26, 20 onto the bearigns 14F, 14R has a precisely predetermined value.

Preferably, a preliminary assembling of all the components left the ring, is first performed. The spacer membranes being in their non-stressed condition. The width of the axial gap separating the inner race of the front bearing and the corresponding shoulder of the shaft is precisely measured.

Thereafter the ring is tailor-made, having a total thickness equal to the width of the axial gap less the predetermined amount corresponding to the desired predetermined axial deflection of the spacer membranes.

The components including the ring, are then finally assembled.

It is noted that the spacer membranes may have other shapes differing from the plane disc-like shape illustrated. Notable, the spacer membranes may have a frusto-conical shape having a wide apex angle. According to a further variant, not shown, the membranes may have a generally flat shape and be provided with annular corrugations.

The advantage of a simple plane disc-like shape is that the physical characteristics of the membrane, notably its axial flexibility may be easily accessed through mathematical models.

Predictability of the results obtained by using such models may be enchanced by proper selection of the materials used for manufacturing the membranes.

Also, the selection of the material to be used for manufacturing the membranes is one of the parameters which may be acted upon when designing an assembly having a desired predetermined axial flexibility.

Among the other parameters which may be varied in order to obtain a desired predetermined axial flexibility are the thickness of the membrane and its inner and outer diameters.

Finally, the scope of the present invention is not restricted to the mounting of a rotary shaft within a fixed housing but also encompasses the mounting of a rotary housing about a fixed shaft, as will be apparent to a man skilled in the art.

We claim:

1. An arrangement for mounting two bearings supporting a shaft within a housing, each said bearing having an inner race secured to the shaft and an outer race, the arrangement comprising:

two annular spacer membranes having a high radial stiffness and a predetermined axial flexibility, said spacer membranes having an outer edge and an inner edge;

the inner edge of each spacer membrane being secured to the outer race of a respective bearing and the outer edge of each spacer membrane being secured within the housing, both said spacer membranes being subjected to a predetermined amount of axial deformation with respect to their unstressed condition, whereby the spacer membranes exert a precisely determined axial preload onto said outer races of said bearing;

said two spacer membranes being located close to each other, whereby both spacer membranes are subjected to almost identical environmental conditions, the outer edges of both spacer membranes being secured within the housing in propinquity to each other, the inner edge of the first spacer membrane being secured to the outer race of a first bearing, said arrangement further comprising:

an elongated tubular sleeve surrounding said shaft, said sleeve having a first end portion secured to the inner edge of the second spacer membrane and a second end portion secured to the outer race of the second bearing; and a centering membrane having an outer edge secured within the housing and an inner edge secured to the second end portion of the sleeve, said centering membrane having a high radial stiffness and a negligible axial stiffness.

2. A mounting arrangement according to claim 1 wherein said spacer membranes are shaped as flat annular discs.

3. A mounting arrangement according to claim 1 wherein said spacer membranes are frusto-conical.

4. A mounting arrangement according to claim 1 wherein said spacer membranes are shaped as generally flat annular discs having circular corrugations.

5. A mounting arrangement according to claim 1 wherein said shaft is fixed and said housing is rotary.

* * * * *

UNITED STATES PATENT AND TRADEMARK OFFICE
CERTIFICATE OF CORRECTION

PATENT NO. : 4,904,095
DATED : February 27, 1990
INVENTOR(S) : Jean-Pierre Fournier and Gilles Turin It is certified that error appears in the above-identified patent and that said Letters Patent is hereby corrected as shown below:

In Column 1, line 10, "bearingns" should read --bearings--.

In Column 4, line 18-19, "and an schematically" should read --and as schematically--.

In Column 5, line 9, "memberane" should read --membrane--.

In Column 5, line 15, "bearingns" should read --bearings--.

In Column 5, line 33, "Notable," should read --Notably,--.

In Column 5, line 43, "enchanced" should read --enhanced--.

In Column 6, line 23, "said bearing;" should read --said bearings;--.

Signed and Sealed this

Fourteenth Day of July, 1992

*Attest:*

DOUGLAS B. COMER

*Attesting Officer*     *Acting Commissioner of Patents and Trademarks*